(12) United States Patent
Park

(10) Patent No.: US 8,576,892 B2
(45) Date of Patent: Nov. 5, 2013

(54) COMMUNICATION APPARATUS AND METHOD

(75) Inventor: Young-Jun Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 360 days.

(21) Appl. No.: 12/987,917

(22) Filed: Jan. 10, 2011

(65) Prior Publication Data

US 2011/0188542 A1  Aug. 4, 2011

(30) Foreign Application Priority Data

Jan. 29, 2010 (KR) .................. 10-2010-0008805

(51) Int. Cl.
 *H04B 1/00* (2006.01)
(52) U.S. Cl.
 USPC ........................................................ 375/130
(58) Field of Classification Search
 USPC ........................................................ 375/130
 See application file for complete search history.

(56) References Cited

U.S. PATENT DOCUMENTS

| 2005/0180375 A1 | 8/2005 | Batra et al. | |
| 2007/0054682 A1* | 3/2007 | Fanning et al. | 455/509 |
| 2007/0291636 A1* | 12/2007 | Rajagopal et al. | 370/208 |
| 2008/0045175 A1* | 2/2008 | Yoon et al. | 455/188.1 |
| 2008/0207156 A1* | 8/2008 | Aytur et al. | 455/307 |
| 2009/0147832 A1* | 6/2009 | Kim et al. | 375/144 |
| 2009/0180517 A1 | 7/2009 | Lee et al. | |
| 2011/0128993 A1* | 6/2011 | Chou | 375/135 |

FOREIGN PATENT DOCUMENTS

| KR | 1020070046289 | 5/2007 |
| KR | 10-0766041 | 10/2007 |
| KR | 10-2007-0112932 | 11/2007 |
| KR | 1020080016337 | 2/2008 |
| KR | 1020090060695 | 6/2009 |
| KR | 1020090078655 | 7/2009 |
| WO | 2008/032912 | 3/2008 |

* cited by examiner

*Primary Examiner* — Juan A Torres
(74) *Attorney, Agent, or Firm* — H.C Park & Associates, PLC

(57) ABSTRACT

A communication apparatus and method for operating a communication apparatus are provided. The communication apparatus is configured to determine whether a sub-frequency band causing interference is present among sub-frequency bands included in a reception frequency band group, and to send to another communication apparatus an interference avoidance request signal which requests the other communication apparatus to transmit signals by use of remaining sub-frequency bands except the sub-frequency band causing interference, leading to simpler and more efficient interference avoidance.

18 Claims, 5 Drawing Sheets

FIG. 3

| TFC NUMBER | SUB-FREQUENCY BAND HOPPING SEQUENCE |
|---|---|
| 1 | 1,2,3,1,2,3 |
| 2 | 1,3,2,1,3,2 |
| 3 | 1,1,2,2,3,3 |
| 4 | 1,1,3,3,2,2 |
| 5 | 1,1,1,1,1,1 |
| 6 | 2,2,2,2,2,2 |
| 7 | 3,3,3,3,3,3 |
| 8 | 1,2,1,2,1,2 |
| 9 | 1,3,1,3,1,3 |
| 10 | 2,3,2,3,2,3 |

COMMUNICATION APPARATUS AND METHOD

CROSS-REFERENCE TO RELATED APPLICATION

This application claims priority from and the benefit under 35 U.S.C. §119(a) of Korean Patent Application No. 10-2010-0008805, filed on Jan. 29, 2010, the disclosure of which is incorporated by reference in its entirety for all purposes.

BACKGROUND

1. Field

The following description relates to a communication apparatus and method for operating the communication apparatus.

2. Discussion of the Background

A detect and avoid (DAA) method decreases the effect of interference among radio signals in a near field network system, such as a wireless home network. For example, Ultra WideBand (UWB) communication, which is used for constructing a wireless home network, etc., uses the same frequency of 3.1 to 10.6 GHz as that of wireless internet or mobile communication, thus leading to interference. Accordingly, in detection of an interference signal, the DAA technology decreases interference by changing a used frequency.

However, according to a conventional DAA method, the power of received signals of a frequency band currently being used is detected, and if the power includes a predetermined level of noise, the current frequency is changed into another frequency causing no interference. However, noise is difficult to be distinguished from a signal.

SUMMARY

Exemplary embodiments of the present invention provide a communication apparatus and a method thereof in which a reception frequency band is divided into a plurality of sub-frequency bands that are managed in groups.

Exemplary embodiments of the present invention provide a communication apparatus and method thereof to determine whether a sub-frequency band causing interference is present among sub-frequency bands belongs to a reception frequency band group, and to send to another communication apparatus an interference avoidance request signal which requests the other communication apparatus to transmit signals by use of remaining sub-frequency bands except for the sub-frequency band causing interference.

Exemplary embodiments of the present invention provide a communication apparatus and method in which the communication apparatus sends to another communication apparatus the interference avoidance request signal that is used to avoid the sub-frequency band causing frequency, thereby decreasing the load in relation to an operation of avoiding the interference with the other communication apparatus.

Exemplary embodiments of the present invention provide a communication apparatus and method in which the communication apparatus does not need to repeat a search operation associated with interference avoidance, leading to simpler and more efficient interference avoidance.

Additional features of the invention will be set forth in the description which follows, and in part will be apparent from the description, or may be learned by practice of the invention.

An exemplary embodiment provides a communication apparatus including a signal transmission unit to process signals of a transmission frequency band and transmit the processed signals; a signal reception unit to receive signals of a reception frequency band group and process the received signals; and a control unit configured to control the signal transmission unit and the signal reception unit, wherein the control unit includes: an interference determination unit to determine whether a sub-frequency band causing interference is present among sub-frequency bands of the reception frequency band group; and an interference avoidance control unit to generate an interference avoidance request signal to request another communication apparatus to transmit signals on remaining sub-frequency bands the reception frequency band group except for the sub-frequency band causing interference.

An exemplary embodiment provides a method for operating a communication apparatus, the method including determining whether a sub-frequency band causing interference is present among sub-frequency bands belonging to a reception frequency band group; and generating an interference avoidance request signal which requests another communication apparatus to transmit signals by use of remaining sub-frequency bands of the reception frequency band group except for the sub-frequency band determined to be causing interference.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is shows a reference table for UWB-frequency hopping according to an exemplary embodiment.

DETAILED DESCRIPTION

Figure 1:
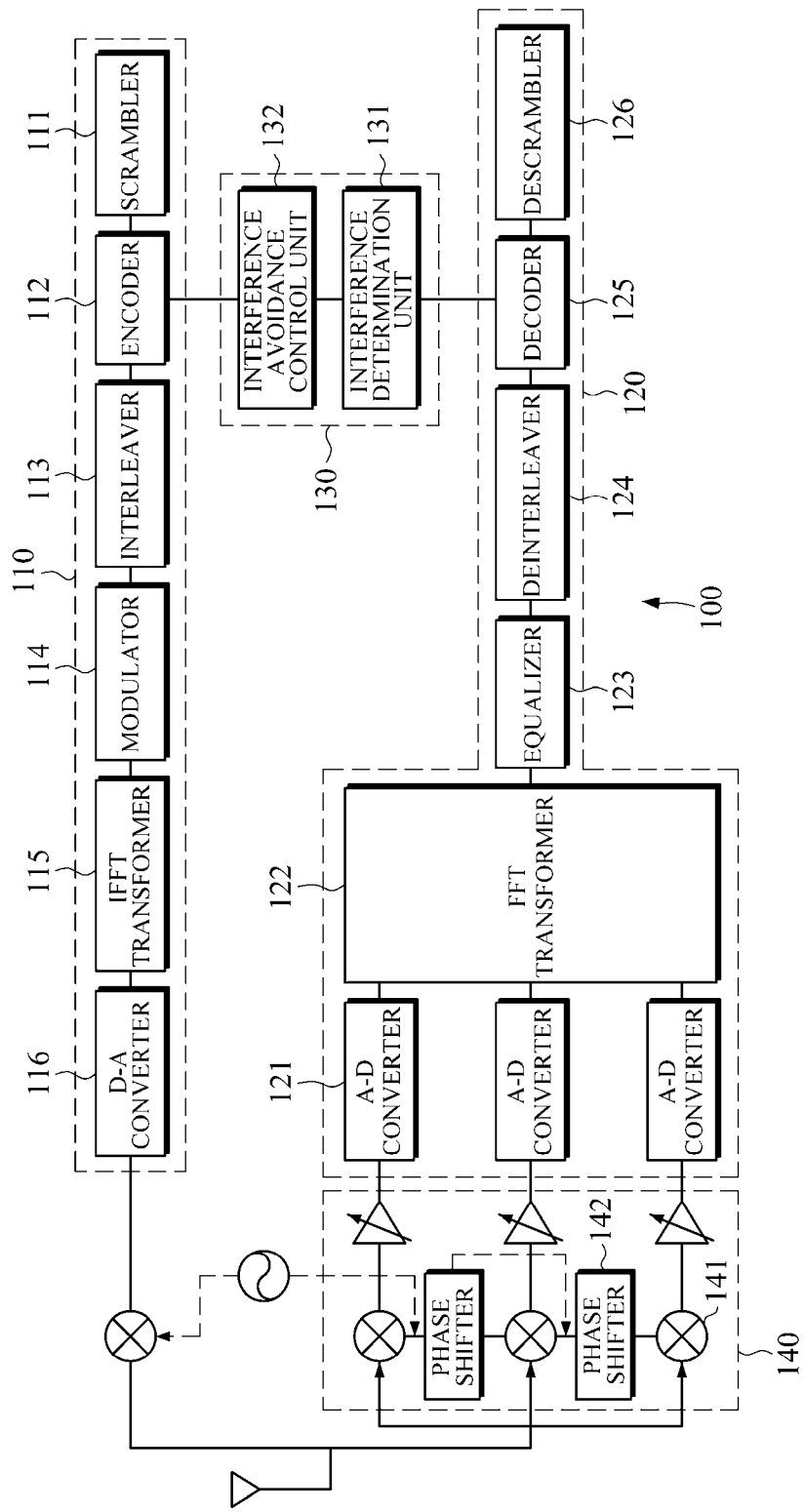
FIG. 1 is a block diagram illustrating a configuration of a communication apparatus according to an exemplary embodiment.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating a configuration a communication apparatus according to an exemplary embodiment. As shown in FIG. 1, the communication apparatus 100 includes a signal transmission unit 110, a signal reception unit 120, and a control unit 130. The communication apparatus 100 may also include a frequency hopping unit 140.

The signal transmission unit 110 processes signals of a transmission frequency band and transmits the processed signals For example, the signal transmission unit 110 may include a scrambler 111 to scramble transmission data, an encoder 112 to encode the scrambled transmission data, an interleaver 113 to interleave the encoded transmission data, a modulator 114 to modulate the interleaved transmission data, an inverse Fast Fourier Transform transformer 115 to perform Inverse Fast Fourier Transform (IFFT) on the modulated transmission data, and a Digital-to-Analog (DA) converter 115 to convert the transmission signal having been subjected to IFFT into a transmission frequency signal and output the transmission frequency signal.

The signal reception unit 120 receives signals of a reception frequency band group and processes the received signals. For example, the signal reception unit 120 may include one or more Analog-to Digital (AD) converters 121 to covert a receive frequency signal to output a receive data, a Fast Fourier Transform Transformer 122 to perform a Fast Fourier Transform (FFT) on the received data, an equalizer 123 to equalize the received data having been subjected to the FFT, a deinterleaver 124 to deinterleave the received data having been subject to the equalization, a decoder 125 to decode the received data having been subject to deinterleaving. and a descrambler 126 to descramble the received data having been subject to decoding.

In the Ultra Wideband (UWB), a reception frequency band is divided into a plurality of sub-frequency bands that are managed in groups. The UWB is a radio technology that was developed for military use in the United States Department of Defense. The UWB uses ultra wide bands having a bandwidth of several GHz for radio data transmission and also provides a very high speed transmission rate ranging from 100 Mbps to 1 Gbps.

The Federal Communication Commission (FCC) previously prohibited the commercial use of the UWB technology because the UWB was developed for the military and causes interference with other networks due to its wide usable frequency band; however, the FCC has permitted the commercial use of the UWB technology since 2002.

Figure 2:
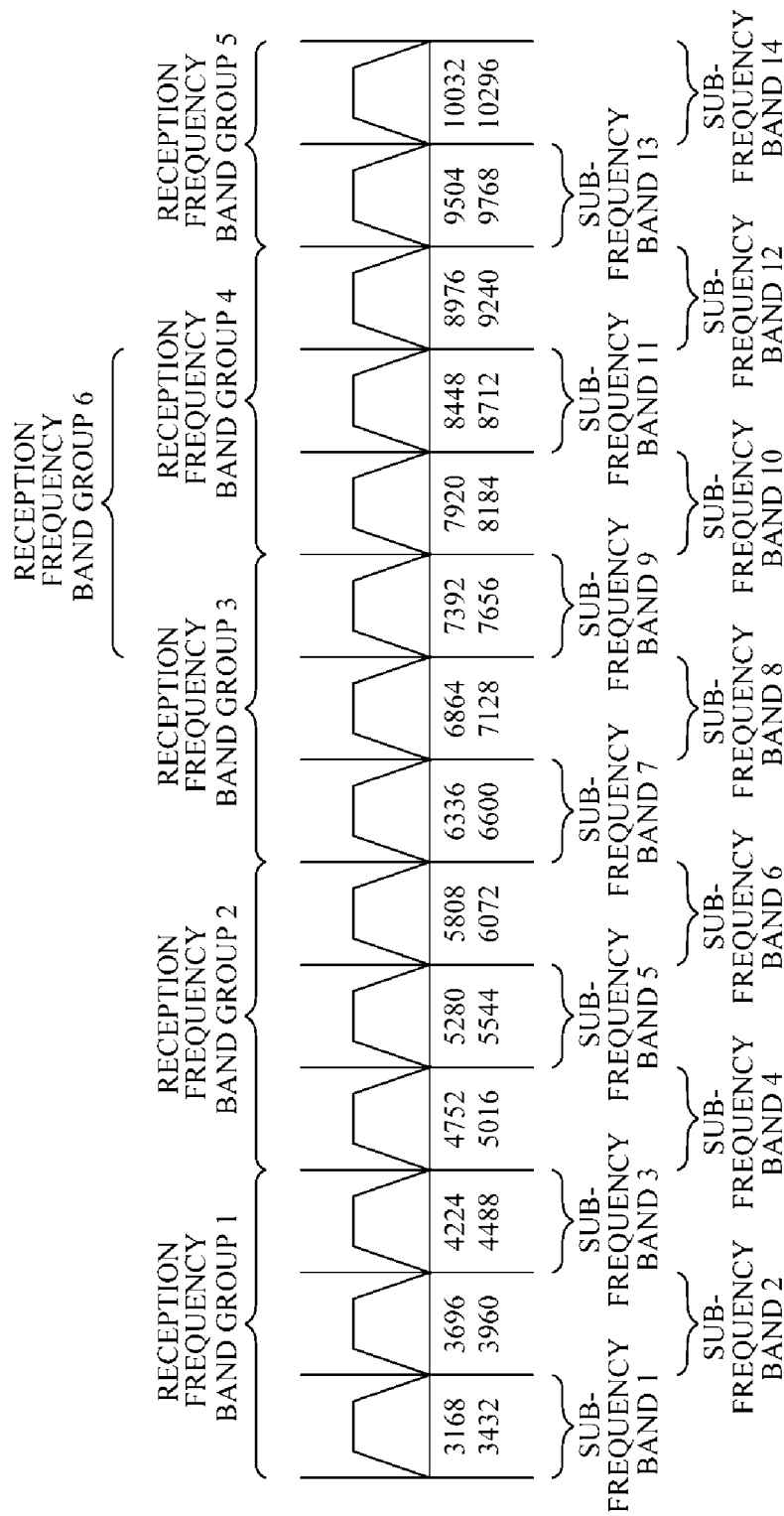
FIG. 2 is shows a UWB-frequency band according to an exemplary embodiment.

FIG. 2 shows a UWB-frequency band according to an exemplary embodiment. As shown in FIG. 2, a frequency band is divided into fourteen sub-frequency bands 1-14 and the sub-frequency bands are classified into five frequency band groups 1-5. According to aspects of the present invention, the bandwidth may be 7.5 GHz, ranging from 3.6 GHz to 10.6 GHz, and the emission limit may be −41.25 dBm.

Each of the frequency band groups 1 to 4 includes three sub-frequency bands, and the frequency band group 5 includes two sub-frequency bands, each of the sub-frequency bands having a bandwidth of 528 MHz. A frequency band group 6 may be included. The frequency band group 6 may be a combination of sub-frequency bands of the frequency band group 3 and the frequency band group 4. Further frequency band groups similar to frequency band group 6 may also be included.

For example, the signal reception unit 120 may use the frequency band group 1 of UWB as the reception frequency band group.

Referring again to FIG. 1, the control unit 130 controls overall operation of the signal transmission unit 110 and the signal reception unit 120. In this case, in order to avoid using a sub-frequency band causing interference among sub-frequency bands belonging to the reception frequency band group, the control unit 130 includes an interference determination unit 131 and an interference avoidance control unit 132.

The interference determination unit 131 determines whether a sub-frequency band causing interference is present among sub-frequency bands belonging to the reception frequency band group. In this case, the interference determination unit 131 determines that a sub-frequency band causing interference is present if a heterogeneous signal having the same frequency band as at least one of the sub-frequency bands belonging to the reception frequency band group is present.

For example, the interference determination unit 131 determines that the sub-frequency band causing interference is present if a modulated signal has a pattern different from a pattern of a signal of the sub-frequency band belonging to the reception frequency band group.

The frequency band group 1 of UWB includes three-sub-frequency bands, i.e., sub-frequency band 1, sub-frequency band 2, and sub-frequency band 3. If the frequency band group 1 of UWB is used as the reception frequency band group, the communication apparatus 100 performs communication using the sub-frequency band 1, sub-frequency band 2, and sub-frequency band 3.

If a reception frequency band is divided into a plurality of sub-frequency bands that are managed in groups, the communication apparatus 100 may perform communication while hopping the sub-frequency bands by use of a frequency hopping technology so that interference is decreased.

FIG. 3 shows a reference table for UWB-frequency hopping according to an exemplary embodiment. The frequency hopping unit 140 of the communication apparatus 100 may perform hopping between sub-frequency bands, referring to a frequency hopping reference table shown in FIG. 3. In the table of FIG. 3, the Time Frequency Code (TFC) number listed on the left side of the table serves as an identifier (ID) to identify a frequency hopping scheme, and the ID sequence listed on the right side of the table specifies a hopping sequence of sub-frequency bands.

For example, if the frequency band group 1 is used as a reception frequency band group and a frequency hopping scheme corresponding to TFC number 1 is set as an initial value, since the ID sequence is 1, 2, 3, 1, 2, 3, the communication apparatus 100 receives signals while hopping the sub-frequency band 1, sub-frequency band 2, and sub-frequency band 3 of the frequency band group 1 of UWB in the sequence of sub-frequency bands 1, 2, 3, 1, 2, and 3.

If the hopping is being performed in the sub-frequency band hopping sequence specified by TFC number 1, and if a heterogeneous signal having the same frequency band as that of the sub-frequency band 1 is received and thus interference is caused, the interference determination unit 131 detects that interference occurs at the sub-frequency band 1.

The interference avoidance control unit 132 sends an other communication apparatus (not shown) with which the communication apparatus 100 is communicating (hereinafter referred to as "the other communication apparatus") an interference avoidance request signal which requests the other communication apparatus to transmit signals to the communication apparatus 100 by use of remaining sub-frequency bands in which there is no interference, i.e., sub-frequency bands except for the sub-frequency band causing interference.

In this case, the interference avoidance control unit 132 of the communication apparatus 100 selects a frequency hopping scheme, which has a sub-frequency band hopping sequence excluding the sub-frequency band causing interference, from the frequency hopping reference table of the reception frequency band group. The communication apparatus 100 transmits the interference avoidance request signal such that the other communication apparatus transmits signals in the selected frequency hopping scheme.

For example, if the hopping is being performed in the sub-frequency band hopping sequence of 1, 2, 3, 1, 2, and 3 specified by TFC number 1, and if the interference determination unit 131 detects that interference occurs at the sub-frequency band 1, the interference avoidance control unit 132 selects a frequency hopping scheme, which has a sub-frequency band hopping sequence excluding the sub-frequency band 1 referring to the frequency hopping reference table.

That is, the interference avoidance control unit 132 selects a frequency hopping scheme among TFC numbers 6, 7, and 10, which implements a sub-frequency band hopping sequence having the sub-frequency bands 2 and/or 3, referring to the frequency hopping reference table shown in FIG. 3.

The interference avoidance control unit 132 generates an interference avoidance request signal, which requests the other communication apparatus to transmit signals through a sub-frequency band hopping sequence specified in a frequency hopping scheme that is selected among TFC number 6, 7 and 10, and transmits the interference avoidance request signal to the other communication apparatus.

For example, in the case of UWB, a demodulated PHY (physical layer) signal has a structure referred to as Protocol Data Unit (PPDU) including a Physical Layer Conversion Protocol (PLCP) preamble, a PLCP header, and a Physical Layer Service Data Unit (PSDU). Information related to communication timing, a channel, and a PHY header is sent in the PLCP header. Information related to PHY standards for communication, MAC header, and parity check is sent in the PLCP preamble. Data to be transferred is sent in the PSDU.

The TFC code number required for communication is sent in the PHY header included in the PLCP header. For example, the interference avoidance control unit 132 records a frequency hopping scheme based on any one selected from TFC number 6, 7 and 10 in the PHY header included in the PLCP header of the PHY signal, i.e., the interference avoidance control unit 132 records a frequency hopping scheme that has a sub-frequency band hopping sequence excluding the sub-frequency band 1 causing interference, thereby transmitting an interference avoid request signal.

In this manner, the communication apparatus 100 sends the other communication apparatus an interference avoidance request signal that is used to avoid a sub-frequency band causing interference among the sub-frequency bands included in the reception frequency band group, i.e., the sub-frequency band 1 of the reception frequency band group 1 may be avoided if the sub-frequency band 1 causes interference among the sub-frequency band 2 and the sub-frequency band 3. Accordingly, the other communication apparatus transmits signals while avoiding the sub-frequency band causing interference, thereby decreasing a burden in relation to an operation of avoiding interference.

In addition, since the other communication apparatus transmits signals while avoiding a sub-frequency band causing interference, the communication apparatus 100 does not need to search for a sub-frequency band causing interference and relieves the need for repeated interference avoidance-related operations. As a result, the communication apparatus 100 may avoid interference.

Meanwhile, the communication apparatus 100 may further include the frequency hopping unit 140. The frequency hopping unit 140 receives signals while hopping between the sub-frequency bands included in the reception frequency band group according to the sub-frequency band hopping sequence included in the frequency hopping scheme which is selected by the interference avoidance control unit 132.

For example, referring again to FIG. 1, if the reception frequency band group includes n sub-frequency bands, the frequency hopping unit 140 may include k mixers 141 and m phase shifters 142 of which k, n, and m are independently each integers. The frequency hopping unit 140 may further include variable amplifiers or automatic gain controllers disposed between the mixers 141 and the A-D converters 121 of the signal reception unit 120.

The frequency hopping unit 140 may phase shift signals such that, for example, the sub-frequency band 1 receives a non phase-shift signal, the sub-frequency band 2 receives a signal, which is phase shifted based on a frequency of a reference signal, the sub-frequency band 3 receives a signal, which is phase shifted based on the previously phase shifted signal.

If the communication apparatus 100 sends the other communication apparatus an interference avoidance request signal that is used to avoid a sub-frequency band causing interference among the sub-frequency bands included in the reception frequency band group, the other communication apparatus transmits signals according to a sub-frequency band hopping sequence which excludes the sub-frequency band causing interference and is included in the frequency hopping scheme. The frequency hopping unit 140 receives signals which are transmitted based on a frequency band selected depending on the sub-frequency band hopping sequence.

In this manner, the frequency hopping unit 140 receives signals while hopping sub-frequency bands according to the sub-frequency band hopping sequence included in the frequency hopping scheme that is selected by the interference avoidance control unit 132. As a result, the frequency hopping unit 140 receives signals while avoiding a sub-frequency band causing interference.

Figure 4:
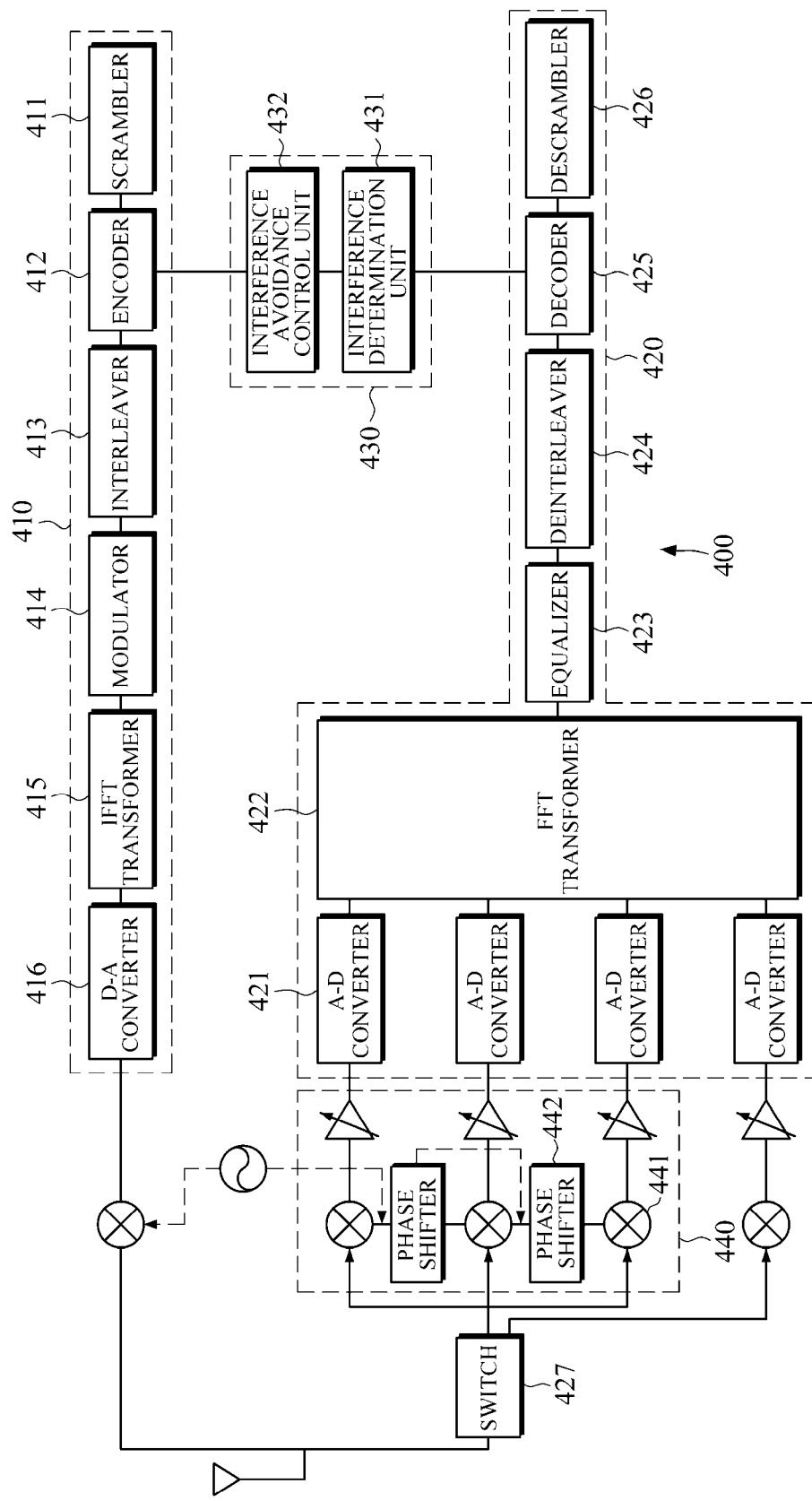
FIG. 4 is a block diagram illustrating a configuration of a communication apparatus according to an exemplary embodiment.

FIG. 4 is a block diagram illustrating a configuration of a communication apparatus according to an exemplary embodiment. The communication apparatus 400 includes a signal transmission unit 410, a signal reception unit 420, and a control unit 430. The communication apparatus 400 may further include a frequency hopping unit 440.

The signal transmission unit 410 processes and transmits signals of a transmission frequency band. For example, the signal transmission unit 410 may include a scrambler 411 to scramble transmission data, an encoder 412 to encode the scrambled transmission data, an interleaver 413 to interleave the encoded transmission data, a modulator 414 to modulate the interleaved transmission data, an inverse Fast Fourier Transform transformer 415 to perform Inverse Fast Fourier Transform (IFFT) on the modulated transmission data, and a Digital-to-Analog (DA) converter 416 to convert the transmit data having been subject to IFFT into a transmission frequency signal and output the transmission frequency signal.

The signal reception unit 420 receives signals of a plurality of reception frequency band groups and processes signals of a reception frequency band group selected from the reception frequency band groups, i.e., the signal reception unit 420 is configured to receive signals of multiple frequency band groups.

For example, the signal reception unit 420 may include one or more Analog-to Digital (AD) converters 421 to convert a reception frequency signal to output received data, a Fast Fourier Transform Transformer 422 to perform a Fast Fourier Transform (FFT) on the received data, an equalizer 423 equalizing the received data having been subject to the FFT, a deinterleaver 424 to deinterleave the received data having been subject to the equalization, a decoder 425 to decode the received data having been subject to deinterleaving, a descrambler 426 to descramble the received data having been subject to decoding, and a switch 427 to perform multiple band switching.

For example, the switch 427 may switch the signal reception unit 420 to receive a frequency band group 1 and a frequency band group 6 of UWB as a reception frequency band group. One of the frequency band group 1 and the frequency band group 6 may be selected by the switch 427 according to the control of the control unit 430. Aspects are not limited thereto such that the switch 427 may switch the signal reception unit 420 to receive any one or more of the frequency band groups of a frequency range, for example, any one or more of the frequency band groups 1 to 6 of the UWB.

The control unit 430 controls overall operation of the signal transmission unit 410 and the signal reception unit 420. In this case, in order to avoid using a sub-frequency band causing interference among sub-frequency bands belonging to the reception frequency group, the control unit 430 includes an interference determination unit 431 and an interference avoidance control unit 432.

The interference determination unit 431 determines whether a sub-frequency causing interference is present among sub-frequency bands belonging to the reception frequency band group. In this case, the interference determination unit 431 determines that a sub-frequency band causing interference is present if a heterogeneous signal having the same frequency band as at least one of the sub-frequency bands belonging to the reception frequency band group is present.

For example, the interference determination unit 431 determines that the sub-frequency band causing interference is present if a modulated signal has a pattern different from a pattern of a signal of the sub-frequency band belonging to the reception frequency band group.

In the case where the frequency band group 1 and the frequency band group 6 of UWB are used as reception frequency band groups and a detect and avoid technology is applied to the frequency band group 1, if the frequency band group 1 is selected through the switch 427, the communication apparatus 400 performs communication through the three sub-frequency bands 1, 2, and 3 of the frequency band group 1.

If a reception frequency band is divided into a plurality of sub-frequency bands that are managed in groups, the communication apparatus 400 may perform communication while hopping the sub-frequency bands by use of a frequency hopping technology so that interference is decreased.

The frequency hopping unit 440 of the communication apparatus 400 may perform hopping between sub-frequency bands, referring to a frequency hopping reference table shown in FIG. 3. In the table of FIG. 3, the Time Frequency Code (TFC) number listed on the left side of the table serves as an identifier (ID) to identify a frequency hopping scheme, and the ID sequence listed on the right side of the table specifies a hopping sequence of sub-frequency bands.

For example, if the frequency band group 1 is used as a reception frequency band group and a frequency hopping scheme corresponding to TFC number 1 is set as an initial value, since the ID sequence is 1, 2, 3, 1, 2, 3, the communication apparatus 400 receives signals while hopping the sub-frequency band 1, sub-frequency band 2, and sub-frequency band 3 of the frequency band group 1 of UWB in the sequence of sub-frequency bands 1, 2, 3, 1, 2 and 3.

If the hopping is being performed in the sub-frequency band hopping sequence specified by TFC number 1, and if a heterogeneous signal having the same frequency band as that of the sub-frequency band 1 is received and thus interference is caused, the interference determination unit 431 detects that interference occurs at the sub-frequency band 1.

The interference avoidance control unit 432 sends an other communication apparatus (not shown) with which the communication apparatus 400 is communicating (again referred to as "the other communication apparatus") an interference avoidance request signal which requests the other communication apparatus to transmit signals to the communication apparatus 400 by use of remaining sub-frequency bands in which there is no interference, i.e., sub-frequency bands except for the sub-frequency band causing interference.

In this case, the interference avoidance control unit 432 of the communication apparatus 400 selects a frequency hopping scheme, which has a sub-frequency band hopping sequence excluding the sub-frequency band causing interference, from the frequency hopping reference table of the reception frequency band group. The communication apparatus 400 transmits the interference avoidance request signal such that the other communication apparatus transmits signals in the selected frequency hopping scheme.

For example, if the hopping is being performed in the sub-frequency band hopping sequence of 1, 2, 3, 1, 2, and 3 specified by TFC number 1, and if the interference determination unit 131 detects that interference occurs at the sub-frequency band 1, the interference avoidance control unit 132 selects a frequency hopping scheme, which has a sub-frequency band hopping sequence excluding the sub-frequency band 1, referring to the frequency hopping reference table.

That is, the interference avoidance control unit 432 selects a frequency hopping scheme among TFC numbers 6, 7 and 10, which implements a sub-frequency band hopping sequence having the sub-frequency bands 2 and/or 3, referring to the frequency hopping reference table shown in FIG. 3.

The interference avoidance control unit 432 generates an interference avoidance request signal, which requests the other communication apparatus to transmit signals through a sub-frequency band hopping sequence specified in a frequency hopping scheme that is selected among TFC number 6, 7 and 10, and transmits the interference avoidance request signal to the other communication apparatus.

For example, in the case of UWB, a demodulated PHY signal has a structure referred to as Protocol Data Unit (PPDU) including a Physical Layer Conversion Protocol (PLCP) preamble, a PLCP header, and a Physical Layer Service Data Unit (PSDU). Information related to communication timing, a channel, and a PHY header is sent in the PLCP header. Information related to PHY standards for communication, MAC header, and parity check is sent in the PLCP preamble. Data to be transferred is sent in the PSDU.

The TFC code number required for communication is sent in the PHY header included in the PLCP header. For example, the interference avoidance control unit 132 records a frequency hopping scheme based on any one selected from TFC number 6, 7 and 10 in the PHY header included in the PLCP header of the PHY signal, i.e., the interference avoidance control unit 432 records a frequency hopping scheme that has a sub-frequency band hopping sequence excluding the sub-frequency band 1 causing interference, thereby transmitting an interference avoid request signal.

In this manner, the communication apparatus 400 sends the other communication apparatus an interference avoidance request signal that is used to avoid a sub-frequency band causing interference among the sub-frequency bands included in the reception frequency band group, i.e., the sub-frequency band 1 of the reception frequency band group 1 may be avoided if the sub-frequency band 1 causes interference among the sub-frequency band 2 and the sub-frequency band 3. Accordingly, the other communication apparatus transmits signals while avoiding the sub-frequency band causing interference, thereby decreasing a burden in relation to an operation of avoiding interference.

In addition, since the other communication apparatus transmits signals while avoiding a sub-frequency band causing interference, the communication apparatus 400 does not need to search for a sub-frequency band causing interference and relieves the need for repeated interference avoidance-related operations. As a result, the communication apparatus 400 may avoid interference.

Meanwhile, the communication apparatus 400 may further include the frequency hopping unit 440. The frequency hopping unit 440 receives signals while hopping between the sub-frequency bands included in the reception frequency band group according to the sub-frequency band hopping sequence included in the frequency hopping scheme which is selected by the interference avoidance control unit 432.

For example, referring again to FIG. 4, if the reception frequency band group includes n sub-frequency bands, the frequency hopping unit 440 may include k mixers 441 and m phase shifters 442 of which k, n, and m are independently each integers. The frequency hopping unit 440 may further include variable amplifiers or automatic gain controllers disposed between the mixers 441 and the A-D converters 421 of the signal reception unit 420.

The frequency hopping unit 440 may phase shift signals such that, for example, the sub-frequency band 1 receives a non phase-shift signal, the sub-frequency band 2 receives a signal, which is phase shifted based on a frequency of a reference signal, the sub-frequency band 3 receives a signal, which is phase shifted based on the previously phase shifted signal.

If the communication apparatus 400 sends the other communication apparatus an interference avoidance request signal that is used to avoid a sub-frequency band causing interference among the sub-frequency bands included in the reception frequency band group, the other communication apparatus transmits signals according to a sub-frequency band hopping sequence which excludes the sub-frequency band causing interference and is included in the frequency hopping scheme. The frequency hopping unit 440 receives signals which are transmitted based on a frequency band selected depending on the sub-frequency band hopping sequence.

In this manner, the frequency hopping unit 440 receives signals while hopping sub-frequency bands according to the sub-frequency band hopping sequence included in the frequency hopping scheme that is selected by the interference avoidance control unit 432. As a result, the frequency hopping unit 440 receives signals while avoiding a sub-frequency band causing interference.

Figure 5:
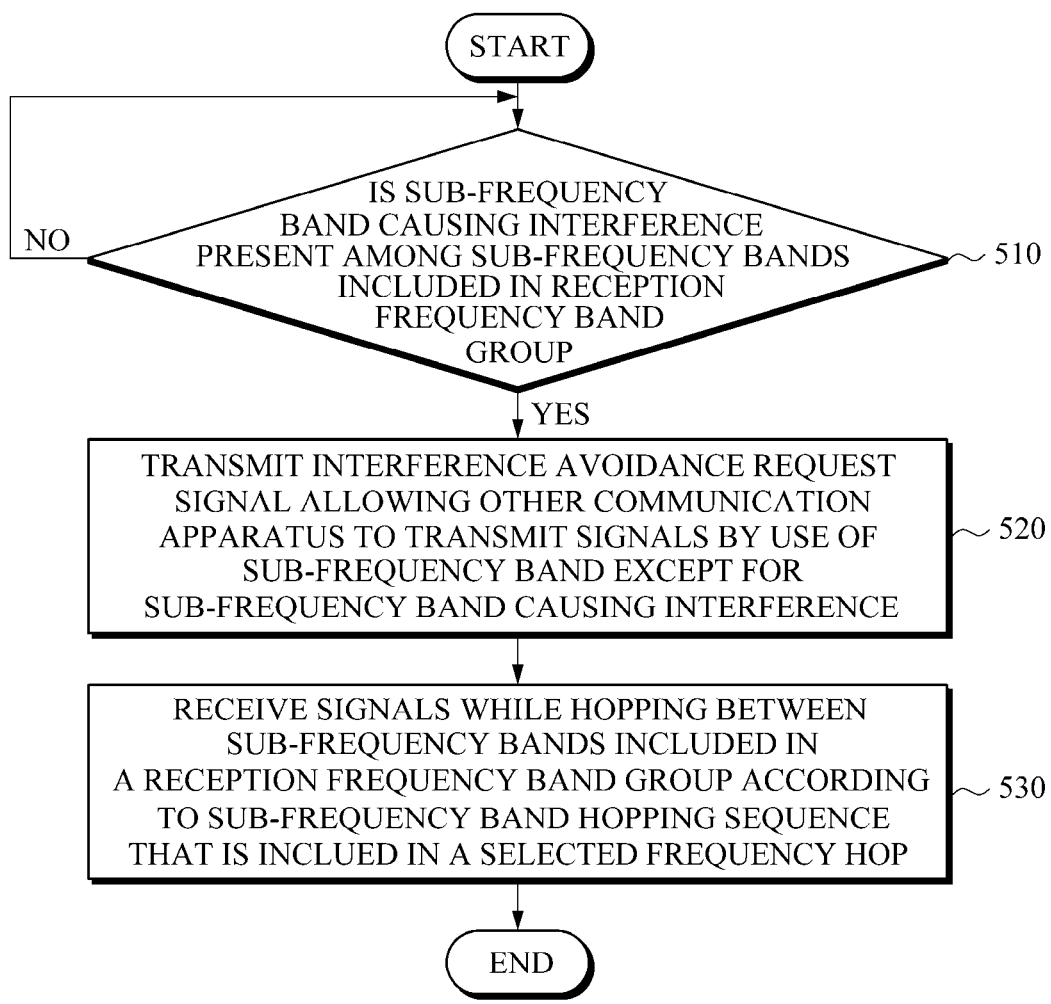
FIG. 5 is a flowchart for a method for a communication apparatus according to an exemplary embodiment.

Hereinafter, an interference avoidance operation of the communication apparatus will be described with reference to FIG. 5. FIG. 5 is a flowchart for a method for a communication apparatus according to an exemplary embodiment.

In operation 510, the communication apparatus determines whether a sub-frequency band causing interference is present among sub-frequency bands belonging to a reception frequency band group. In operation 510, the communication apparatus may determine that a sub-frequency band causing interference is present if a heterogeneous signal having the same frequency band as at least one of the sub-frequency bands belonging to the reception frequency band group.

For example, in operation 510, the communication apparatus may determine that a sub-frequency band causing interference is present if a modulated signal has a pattern different from a pattern of a signal of the sub-frequency band belonging to the reception frequency band group.

In operation 520, the communication apparatus sends another communication apparatus an interference avoidance request signal, if it is determined in operation 510 that a sub-frequency band causing interference is present. The interference avoidance request signal allows the other communication apparatus to transmit signals by use of remaining sub-frequency bands except for the sub-frequency band causing interference.

In operation 520, the communication apparatus selects a frequency hopping scheme, which has a sub-frequency band hopping sequence excluding the sub-frequency band causing interference, from a frequency hopping reference table of the reception frequency band group, and sends the interference avoidance request signal such that a signal is transmitted in the selected frequency hopping scheme.

The other communication apparatus receives the interference avoidance request signal from the communication apparatus and transmits signals while avoiding a sub-frequency band causing interference. In operation 530, the communication apparatus receives signals while hopping between the sub-frequency bands included in the reception frequency band group according to the sub-frequency band hopping sequence included in the selected frequency hopping scheme.

In this manner, the communication apparatus sends the other communication apparatus the interference avoidance request signal to avoid the sub-frequency band causing interference among the sub-frequency bands included in the reception frequency band group. Accordingly, the other communication apparatus transmits signals while avoiding the sub-frequency band causing interference, thereby decreasing a burden in relation to an operation of avoiding interference.

In addition, since the other communication apparatus transmits signals while avoiding the sub-frequency band causing interference, the communication apparatus does not need to search for a sub-frequency band causing interference and relieves the need for repeated interference avoid-related operations. As a result, the communication apparatus according to aspects of the present invention may avoid interference.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and the like. The computer readable recording medium can also be distributed over network coupled computer systems so that the computer readable code is stored and executed in a distributed fashion Also, functional programs, codes, and code segments for accomplishing the aspects of the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A communication apparatus, comprising:
 a signal transmission unit to process signals of a transmission frequency band and transmit the processed signals;
 a signal reception unit to receive signals of a reception frequency band group and process the received signals; and
 a control unit configured to control the signal transmission unit and the signal reception unit, wherein
 the control unit comprises:
  an interference determination unit to determine whether a sub-frequency band causing interference is present among sub-frequency bands of the reception frequency band group; and
  an interference avoidance control unit to select a frequency hopping scheme comprising a sub-frequency band hopping sequence excluding the sub-frequency band causing interference, and to generate an interference avoidance request signal to request another communication apparatus to transmit signals according to the selected frequency hopping scheme.

2. The communication apparatus of claim 1, wherein the interference avoidance control unit selects a frequency hopping scheme from a frequency hopping reference table of the reception frequency band group.

3. The communication apparatus of claim 1, further comprising:
 a frequency hopping unit to receive signals while hopping between the sub-frequency bands of the reception frequency band group according to the selected sub-frequency band hopping sequence of the frequency hopping scheme.

4. The communication apparatus of claim 1, wherein the interference determination unit determines that the sub-frequency band causing interference is present when a heterogeneous signal having the same frequency band as at least one of the sub-frequency bands belonging to the reception frequency band group is present.

5. The communication apparatus of claim 1, wherein the signal reception unit receives signals of a plurality of reception frequency band groups and processes signals selected from the signals of the reception frequency band groups.

6. The communication apparatus of claim 1, wherein the interference avoidance control unit includes the selected frequency hopping scheme in a Physical Layer (PHY) signal for sending to the another communication apparatus.

7. The communication apparatus of claim 1, wherein the interference avoidance control unit records a new frequency hopping scheme in a Physical Layer Conversion Protocol (PLCP) preamble for sending to the another communication apparatus.

8. The communication apparatus of claim 4, wherein the interference determination unit determines that the sub-frequency band causing interference is present when a modulated signal has a pattern different from a pattern of a signal of the sub-frequency band belonging to the reception frequency band group.

9. The communication apparatus of claim 5, further comprising:
 a switch to perform multiple band switching between the plurality of reception band groups.

10. A method for operating a communication apparatus, the method comprising:
 determining whether a sub-frequency band causing interference is present among sub-frequency bands belonging to a reception frequency band group;
 selecting a frequency hopping scheme comprising a sub-frequency band hopping sequence excluding the sub-frequency band causing interference; and
 generating an interference avoidance request signal which requests another communication apparatus to transmit signals according to the selected frequency hopping scheme.

11. The method of claim 10, further comprising:
 sending the interference avoidance request signal to the other communication apparatus such that the other communication apparatus transmits signals using the selected frequency hopping scheme.

12. The method of claim 10, wherein the selecting a frequency hopping scheme further comprises selecting from a frequency hopping reference table of the reception frequency band group.

13. The method of claim 10, wherein determining whether a sub-frequency band causing interference is present comprises determining that the sub-frequency band causing interference is present when a heterogeneous signal having the same frequency band as at least one of the sub-frequency bands belonging to the reception frequency band group is present.

14. The method of claim 10, further comprising:
 multiple band switching between a plurality of reception band groups.

15. The method of claim 10, further comprising including the selected frequency hopping scheme in a Physical Layer (PHY) signal for sending to the another communication apparatus.

16. The method of claim 10, further comprising recording a new frequency hopping scheme in a Physical Layer Conversion Protocol (PLCP) preamble for sending to the another communication apparatus.

17. The method of claim 12, further comprising:
 receiving signals while hopping between the sub-frequency bands of the reception frequency band group according to the sub-frequency band hopping sequence of the selected frequency hopping scheme.

18. The method of claim 13, wherein determining whether a sub-frequency band causing interference is present comprises determining that the sub-frequency band causing interference is present when a modulated signal has a pattern different from a pattern of a signal of the sub-frequency band belong to the reception frequency band group.

* * * * *